United States Patent
Wentink

(10) Patent No.: US 7,933,293 B2
(45) Date of Patent: Apr. 26, 2011

(54) LINK MARGIN NOTIFICATION USING RETURN FRAME

(75) Inventor: Menzo Wentink, Utrecht (NL)

(73) Assignee: Xocyst Transfer AG L.L.C., Wilmington, DE (US)

( * ) Notice: Subject to any disclaimer, the term of this patent is extended or adjusted under 35 U.S.C. 154(b) by 1514 days.

(21) Appl. No.: 10/880,366

(22) Filed: Jun. 30, 2004

(65) Prior Publication Data

US 2005/0030976 A1 Feb. 10, 2005

Related U.S. Application Data

(63) Continuation-in-part of application No. 10/353,391, filed on Jan. 29, 2003, now Pat. No. 6,791,962.

(60) Provisional application No. 60/388,569, filed on Jun. 12, 2002, provisional application No. 60/515,701, filed on Oct. 31, 2003.

(51) Int. Cl.
   *H04J 3/24* (2006.01)
(52) U.S. Cl. ........ 370/473; 342/359; 370/321; 370/338; 370/352; 398/108; 455/63.1; 455/423; 455/431
(58) Field of Classification Search .................. 370/352, 370/318, 313, 338, 473, 321; 455/69, 522, 455/466, 63.1, 423, 431; 704/221; 342/359; 375/299; 398/108
See application file for complete search history.

(56) References Cited

U.S. PATENT DOCUMENTS

| | | | |
|---|---|---|---|
| 5,371,734 A | 12/1994 | Fischer | |
| 5,463,659 A | 10/1995 | Nealon et al. | |
| 5,465,398 A * | 11/1995 | Flammer | 455/69 |
| 5,487,069 A | 1/1996 | O'Sullivan | |
| 5,537,414 A | 7/1996 | Takiyasu et al. | |
| 5,636,220 A | 6/1997 | Vook | |
| 5,752,201 A | 5/1998 | Kivari | |
| 5,768,531 A | 6/1998 | Lin | |
| 5,812,968 A * | 9/1998 | Hassan et al. | 704/221 |
| 5,862,142 A | 1/1999 | Takiyasu et al. | |
| 5,991,287 A | 11/1999 | Diepstraten et al. | |
| 5,995,849 A | 11/1999 | Williams | |
| 5,999,127 A * | 12/1999 | Dezelan | 342/359 |
| 6,047,178 A | 4/2000 | Frlan | |
| 6,052,557 A | 4/2000 | Kinnunen et al. | |

(Continued)

FOREIGN PATENT DOCUMENTS

DE 10228342 A1 9/2003

(Continued)

OTHER PUBLICATIONS

A. Soomro and S. Choi Philips Research USA, Propsal to Add Link Margin Field in IEEE 802.11h Submission, Sep. 2001, Slides 9-14.*

(Continued)

*Primary Examiner* — Gerald Gauthier

(57) ABSTRACT

Disclosed herein are techniques for power management in wireless networks. Based upon receipt of an indication of the link margin of a receiving wireless device, a transmitting wireless device may adjust its transmit power commensurate with the link margin. The indication of the link margin may be transmitted from the receiving wireless device to the transmitting wireless device periodically. Alternatively, the receiving wireless station may provide the indication of the link margin in response to information received from the transmitting wireless device. In this instance, the indication of the link margin may be included in a piggyback acknowledgement (ACK) frame conventionally used to acknowledge receipt of the information transmitted by the transmitting wireless station.

41 Claims, 3 Drawing Sheets

U.S. PATENT DOCUMENTS

| | | | | |
|---|---|---|---|---|
| 6,084,865 | A * | 7/2000 | Dent | 370/321 |
| 6,119,014 | A | 9/2000 | Alperovich et al. | |
| 6,192,230 | B1 | 2/2001 | van Bokhorst et al. | |
| 6,208,627 | B1 | 3/2001 | Menon et al. | |
| 6,222,842 | B1 | 4/2001 | Sasyan et al. | |
| 6,292,672 | B1 | 9/2001 | Chavez, Jr. | |
| 6,301,609 | B1 | 10/2001 | Aravamudan et al. | |
| 6,339,713 | B1 | 1/2002 | Hansson et al. | |
| 6,343,083 | B1 * | 1/2002 | Mendelson et al. | 370/466 |
| 6,347,095 | B1 | 2/2002 | Tang et al. | |
| 6,360,277 | B1 | 3/2002 | Ruckley et al. | |
| 6,415,146 | B1 | 7/2002 | Capece | |
| 6,424,820 | B1 | 7/2002 | Burdick et al. | |
| 6,430,604 | B1 | 8/2002 | Ogle et al. | |
| 6,463,290 | B1 | 10/2002 | Stilp et al. | |
| 6,470,058 | B1 * | 10/2002 | Michalski et al. | 375/299 |
| 6,484,027 | B1 | 11/2002 | Mauney et al. | |
| 6,487,180 | B1 | 11/2002 | Borgstahl et al. | |
| 6,496,694 | B1 | 12/2002 | Menon et al. | |
| 6,507,739 | B1 * | 1/2003 | Gross et al. | 455/431 |
| 6,525,690 | B2 * | 2/2003 | Rudow et al. | 342/357.13 |
| 6,529,748 | B1 | 3/2003 | Bruner | |
| 6,539,232 | B2 | 3/2003 | Hendrey et al. | |
| 6,542,748 | B2 | 4/2003 | Hendrey et al. | |
| 6,542,749 | B2 | 4/2003 | Tanaka et al. | |
| 6,542,750 | B2 | 4/2003 | Hendrey et al. | |
| 6,574,266 | B1 | 6/2003 | Haartsen | |
| 6,580,704 | B1 | 6/2003 | Wellig et al. | |
| 6,594,666 | B1 | 7/2003 | Biswas et al. | |
| 6,618,005 | B2 | 9/2003 | Hannah et al. | |
| 6,625,456 | B1 | 9/2003 | Busso et al. | |
| 6,631,271 | B1 | 10/2003 | Logan | |
| 6,665,520 | B2 | 12/2003 | Romans | |
| 6,744,743 | B2 * | 6/2004 | Walton et al. | 370/318 |
| 6,759,956 | B2 | 7/2004 | Menard et al. | |
| 6,763,240 | B1 * | 7/2004 | Chambers et al. | 455/466 |
| 6,778,515 | B2 | 8/2004 | Bolgiano et al. | |
| 6,785,251 | B2 | 8/2004 | Bolgiano et al. | |
| 6,788,688 | B2 | 9/2004 | Trebes, Jr. | |
| 6,791,962 | B2 * | 9/2004 | Wentink | 370/338 |
| 6,795,701 | B1 | 9/2004 | Baker et al. | |
| 6,799,056 | B2 | 9/2004 | Curley et al. | |
| 6,810,246 | B1 * | 10/2004 | Kalofonos et al. | 455/423 |
| 6,826,162 | B2 | 11/2004 | Haines et al. | |
| 6,842,460 | B1 | 1/2005 | Olkkonen et al. | |
| 6,904,055 | B2 | 6/2005 | Pichna et al. | |
| 6,925,286 | B1 | 8/2005 | Kraiem et al. | |
| 6,978,151 | B2 * | 12/2005 | Choi et al. | 455/522 |
| 6,985,461 | B2 | 1/2006 | Singh | |
| 7,068,615 | B2 * | 6/2006 | Niesen | 370/313 |
| 7,133,909 | B2 | 11/2006 | Bahl | |
| 7,212,827 | B1 | 5/2007 | Veschl | |
| 7,245,592 | B2 | 7/2007 | Soomro et al. | |
| 7,251,235 | B2 | 7/2007 | Wentink | |
| 7,260,392 | B2 | 8/2007 | Kitchin | |
| 7,277,692 | B1 | 10/2007 | Jones et al. | |
| 7,308,202 | B2 * | 12/2007 | Roes et al. | 398/108 |
| 7,359,727 | B2 * | 4/2008 | Tsien et al. | 455/522 |
| 7,421,466 | B2 | 9/2008 | Haines et al. | |
| 7,450,550 | B2 | 11/2008 | Jin | |
| 7,545,771 | B2 | 6/2009 | Wentink | |
| 2001/0031626 | A1 | 10/2001 | Lindskog et al. | |
| 2002/0025839 | A1 | 2/2002 | Usui | |
| 2002/0087724 | A1 | 7/2002 | Datta et al. | |
| 2002/0159544 | A1 | 10/2002 | Karaoguz | |
| 2002/0168040 | A1 | 11/2002 | Coffey | |
| 2002/0168993 | A1 | 11/2002 | Choi et al. | |
| 2002/0172186 | A1 | 11/2002 | Larsson | |
| 2002/0191573 | A1 * | 12/2002 | Whitehill et al. | 370/338 |
| 2003/0010524 | A1 | 1/2003 | Connor | |
| 2003/0036354 | A1 | 2/2003 | Lee et al. | |
| 2003/0096576 | A1 | 5/2003 | Salonidis et al. | |
| 2003/0106241 | A1 | 6/2003 | Marden et al. | |
| 2003/0126213 | A1 | 7/2003 | Betzler | |
| 2003/0140084 | A1 | 7/2003 | D'Angelo | |
| 2003/0142641 | A1 | 7/2003 | Sumner et al. | |
| 2003/0185241 | A1 * | 10/2003 | Lu et al. | 370/476 |
| 2003/0198196 | A1 | 10/2003 | Bahl et al. | |
| 2003/0210658 | A1 | 11/2003 | Hernandez et al. | |
| 2003/0220765 | A1 | 11/2003 | Overy et al. | |
| 2003/0232598 | A1 | 12/2003 | Aljadeff et al. | |
| 2004/0005861 | A1 | 1/2004 | Tauchi | |
| 2004/0048609 | A1 | 3/2004 | Kosaka | |
| 2004/0056901 | A1 | 3/2004 | March et al. | |
| 2004/0078598 | A1 | 4/2004 | Barber et al. | |
| 2004/0095907 | A1 | 5/2004 | Agee et al. | |
| 2004/0125775 | A1 | 7/2004 | Rios | |
| 2004/0125776 | A1 | 7/2004 | Haugli et al. | |
| 2004/0127214 | A1 | 7/2004 | Reddy et al. | |
| 2004/0147249 | A1 | 7/2004 | Wentink | |
| 2004/0192413 | A1 | 9/2004 | Frank | |
| 2004/0203698 | A1 | 10/2004 | Comp | |
| 2004/0236850 | A1 | 11/2004 | Krumm et al. | |
| 2004/0242154 | A1 | 12/2004 | Takeda et al. | |
| 2004/0246934 | A1 | 12/2004 | Kim | |
| 2005/0030976 | A1 | 2/2005 | Wentink | |
| 2005/0094588 | A1 | 5/2005 | Wentink | |
| 2005/0122927 | A1 | 6/2005 | Wentink | |
| 2005/0135305 | A1 | 6/2005 | Wentink | |
| 2005/0157674 | A1 | 7/2005 | Wentink | |
| 2005/0265305 | A1 | 12/2005 | Furukawa et al. | |
| 2006/0148406 | A1 * | 7/2006 | Strater et al. | 455/63.1 |
| 2007/0077894 | A1 * | 4/2007 | Zhang et al. | 455/75 |
| 2008/0095126 | A1 * | 4/2008 | Mahany et al. | 370/338 |

FOREIGN PATENT DOCUMENTS

| | | |
|---|---|---|
| EP | 1168676 | 1/2001 |
| WO | 2002/49387 | 6/2002 |
| WO | WO 2004/077920 A2 | 9/2004 |
| WO | 2005/046134 | 5/2005 |
| WO | 2005/067535 | 7/2005 |

OTHER PUBLICATIONS

IEEE Standard 802.11h Amendment 5: Spectrum and transmit power management extensions in the 5 GHz band in Europe, published Oct. 14, 2003, IEEE.*

Search report for co-pending PCT Application No. PCT/US04/033487 dated Feb. 2, 2005.

European Search Report and Written Opinion for Application No. PCT/US2004/033487 dated Feb. 2, 2005, 14 pages.

802.11 Wireless Networks: The Definitive Guide. O'Reilly & Associates, 2002. pp. 1-14.

International Search Report for PCT/US2005/01303 dated Nov. 1, 2006.

PanGo Networks, PanGo Mobile Applications Suite, Intelligent Wireless, Copyright 2003, 2 pages.

PanGo Networks, PanGo Proximity Platform, Intelligent Wireless, Copyright 2003, 2 pages.

PanGo Networks, Intelligent Wireless, Mobile Application Suite, Copyright 2003, 1 page.

Donovan, Jeremey, Location awareness beyond E911, EETimes, Jun. 9, 2003, 1 page.

PanGo Networks, Intelligent Wireless, Overview, Copyright 2003, 1 page.

PanGo Networks, Intelligent Wireless, Technology, How it Works, Copyright 2003, 1 page.

Palm, Palm: Providing Fluid Connectivity in a Wireless World, 2002, 10 pages.

Kitchin, Wireless Address Resolution Protocol, IEEE, pp. 1-13 Jan. 2002.

Ho et al., MediaPlex—An IEEE 802.11 Enhanced Protocol for QoS-Driven Wireless LANs, IEEE, pp. 1-25, Nov. 3, 2000.

ANSI/IEEE Std. 802.11, Part 11: Wireless LAN Medium Access Control (MAC) and Physical Layer (PHY) Specification, pp. 1-513, 1999.

Communication from the European Patent Office for EP Application 04794757.7, dated Jul. 28, 2009.

IEEE Std 802.11e/D3.0, Part 11: Wireless Medium Access Control (MAC) and Physical Layer (PHY) Specifications: Medium Access Control (MAC) Enhancements for Quality of Service (QoS), IEEE, 138 pages, May 2002.

International Preliminary Report on patentability for PCT/US2005/001303, issued Nov. 29, 2006.
International Preliminary Report on patentability for PCT/US2004/033487, issued May 1, 2006.
Advisory Action for U.S. Appl. No. 10/977,470, mailed Dec. 3, 2008.
Advisory Action on U.S. Appl. No. 11/035,065, mailed Mar. 26, 2010.
Final Office Action for U.S. Appl. No. 10/977,469, mailed Aug. 8, 2008.
Final Office Action on U.S. Appl. No. 10/977,490, mailed Jan. 21, 2010.
Final Office Action on U.S. Appl. No. 10/880,367, mailed Jan. 4, 2008.
Final Office Action on U.S. Appl. No. 10/880,367, mailed Jun. 22, 2009.
Final Office Action on U.S. Appl. No. 10/880,370, mailed Nov. 3, 2006.
Final Office Action on U.S. Appl. No. 10/977,470, mailed Jul. 17, 2008.
Final Office Action on U.S. Appl. No. 10/977,490, mailed Dec. 12, 2007.
Final Office Action on U.S. Appl. No. 10/977,490, mailed Mar. 13, 2009.
Final Office Action on U.S. Appl. No. 11/035,065, mailed Jan. 21, 2009.
Final Office Action on U.S. Appl. No. 11/035,065, mailed Jan. 22, 2010.
Non-Final Office Action for U.S. Appl. No. 10/977,470, mailed Feb. 26, 2009.
Non-Final Office Action for U.S. Appl. No. 10/977,470, mailed Jan. 14, 2008.
Non-Final Office Action on U.S. Appl. No. 10/977,490, mailed Jun. 29, 2009.
Non-Final Office Action on U.S. Appl. No. 10/880,325, mailed Mar. 16, 2007.
Non-Final Office Action on U.S. Appl. No. 10/880,367, mailed Apr. 30, 2008.
Non-final Office Action on U.S. Appl. No. 10/880,367, mailed Aug. 3, 2010.
Non-Final Office Action on U.S. Appl. No. 10/880,367, mailed Dec. 31, 2008.
Non-Final Office Action on U.S. Appl. No. 10/880,367, mailed Jul. 11, 2007.
Non-Final Office Action on U.S. Appl. No. 10/880,367, mailed Sep. 15, 2009.
Non-Final Office Action on U.S. Appl. No. 10/880,370, mailed Apr. 6, 2006.
Non-Final Office Action on U.S. Appl. No. 10/977,469, mailed Jan. 9, 2008.
Non-Final Office Action on U.S. Appl. No. 10/977,490, mailed Apr. 23, 2008.
Non-Final Office Action on U.S. Appl. No. 10/977,490, mailed Feb. 28, 2007.
Non-Final Office Action on U.S. Appl. No. 10/977,490, mailed Jul. 23, 2007.
Non-Final Office Action on U.S. Appl. No. 11/035,065, mailed Apr. 1, 2008.
Non-Final Office Action on U.S. Appl. No. 11/035,065, mailed Sep. 23, 2009.
Notice of Allowance for U.S. Appl. No. 10/353,391, mailed Feb. 10, 2004.
Notice of Allowance for U.S. Appl. No. 10/880,370, mailed Jun. 12, 2007.
Notice of Allowance for U.S. Appl. No. 10/977,469, mailed Feb. 10, 2009.
Notice of Allowance of U.S. Appl. No. 10/880,367, mailed Mar. 8, 2010.
Notice of Allowance on U.S. Appl. No. 10/977,470, mailed Jan. 6, 2011.
Final Office action on U.S. Appl. No. 12/460,974, mailed Jan. 27, 2011.
Non-final Office Action on U.S. Appl. No. 10/880,367, mailed Jan. 21, 2011.

* cited by examiner

LINK MARGIN NOTIFICATION USING RETURN FRAME

CROSS-REFERENCE TO RELATED APPLICATIONS

This application is a continuation-in-part of U.S. patent application Ser. No. 10/353,391 filed Jan. 29, 2003, now U.S. Pat. No. 6,791,962, issued Sep. 14, 2004, which also claims benefit of U.S. Provisional Application No. 60/388,569, filed Jun. 12, 2002, entitled "Direct Link Protocol In Wireless Local Area" and also claims benefit of U.S. Patent Application No. 60/515,701 filed Oct. 31, 2003 and entitled "Location Awareness in Wireless Networks," the disclosures of which are herein incorporated by reference in their entireties.

U.S. patent application Ser. No. 10/880,370 filed concurrently herewith and entitled "Event-Based MultiChannel Direct Link," U.S. patent application Ser. No. 10/880,367 filed concurrently herewith and entitled "Direct Link Relay In a Wireless Network," U.S. patent application Ser. No. 10/880,325 filed concurrently herewith and entitled "Time-Scheduled Multichannel Direct Link," all claiming benefit of U.S. Provisional Application No. 60/515,701 filed Oct. 31, 2003, the entireties of which are incorporated by reference herein.

FIELD OF THE INVENTION

The present invention relates generally to power management in wireless networks and more particularly to minimizing the transmission power used by a wireless device.

BACKGROUND OF THE INVENTION

Various wireless standards, such as Institute of Electrical and Electronics Engineers (IEEE) standards 802.11a/b/c/d/e/f/g/h/i/j/k/ (referred to collectively as IEEE 802.11), provide for wireless connectivity between wireless devices, such as, for example, between a wireless station and an access point connected to an infrastructure network. These wireless standards typically provide processes for managing the power consumption of the wireless devices in an attempt to minimize the power consumed by the wireless devices, which generally are battery powered and therefore have a limited supply of power.

One technique frequently used to minimize the power consumption of a wireless device includes increasing the transmission rate (also referred to as the PHY rate) of the wireless device. It will be appreciated that increasing the transmission rate reduces the power consumption as the time needed to transmit information is reduced, thereby reducing the duration that the antenna of the wireless device is active while transmitting the signal representative of the information. However, the maximum transmission rate supportable between wireless devices may be limited for any number of reasons, such as, for example, the distance between wireless devices, the presence of noise or other interference, the individual capabilities of the wireless devices, and the like.

In addition to, or instead of, implementing the maximum supportable transmission between wireless devices, a reduction in the transmit power used by a wireless device may be performed to further reduce the power consumption of the wireless device. The degree to which the transmit power of a transmitting wireless station may be reduced generally is related to the link margin of a receiving wireless device, where the link margin typically represents a ratio of the actual received signal power to the minimum received signal power desired or acceptable by the receiving station. Thus, the transmitting station, in theory, could reduce its transmit power by an amount up to the link margin of the receiving wireless device without violating the minimum received signal power requirement of the receiving wireless device. To illustrate, assuming that a receiving wireless station receives a frame at a particular transmission rate with a signal-to-noise ratio (SNR) of 25 decibels (dB) and further assuming that the receiving wireless station is formatted to require a minimum SNR of 12 dB for the particular transmission rate. From these values, the link margin for the receiving wireless station may be calculated as 13 dB (25 dB–12 dB). Therefore, in this example, the transmitting wireless device could reduce its transmit power by up to 13 dB while still transmitting with enough power to satisfy the minimum requirements of the receiving wireless device.

While the reduction of transmit power commensurate with the link margin of a receiving wireless device can significantly reduce power consumption by a transmitting wireless device, conventional wireless devices typically transmit at the maximum power level permitted by the characteristics of the device or as permitted by regulation (e.g., radio power transmission regulations promulgated by the Federal Communications Commission) because they are unaware of the link margin of the receiving wireless device. As a result, excessive power is consumed as the transmitting wireless station transmits information at a transmit power significantly higher than would otherwise be necessary.

Accordingly, techniques for minimizing the transmit power of a transmitting wireless device in view of the link margin of a receiving wireless device would be advantageous.

SUMMARY OF THE INVENTION

The present invention mitigates or solves the above-identified limitations in known solutions, as well as other unspecified deficiencies in known solutions. A number of advantages associated with the present invention are readily evident to those skilled in the art, including economy of design and resources, transparent operation, cost savings, etc.

The present invention is directed to a method including determining a link margin of a second wireless device based at least in part on one or more signals received from a first wireless device, and transmitting an indication of the link margin for reception by the first wireless device in a wireless network.

A further aspect of this invention is a method including receiving, at a first wireless device, an indication of a link margin of a second wireless device, and adjusting a transmit power of the first wireless device based at least in part on the indication of the link margin of the second wireless device in a wireless network.

A further aspect of this invention is a method including receiving, at a second wireless device, information from a first wireless device, and transmitting link margin information of the second wireless device for reception by the first wireless device in response to the receipt of the information from the first wireless device in a wireless network.

A further aspect of this invention is a method including transmitting, from a first wireless device, information for reception by a second wireless device, receiving an acknowledgment of a receipt of the information from the second wireless device, the acknowledgement including link margin information of the second wireless device in a wireless network.

A further aspect of this invention is a method including receiving, at a second wireless device, information transmitted by a first wireless device at a first transmit power, transmitting an acknowledgement (ACK) frame from the second wireless device for reception by the first wireless device, the ACK frame acknowledging receipt of the information at the second wireless device and including link margin information of the second wireless device, and receiving, at the second wireless device, information transmitted by the first wireless device at a second transmit power, wherein a difference between the first transmit power and the second transmit power is based on the link margin information in a wireless network.

A further aspect of this invention is a wireless device including a transceiver, a link margin measurement module for measuring a link margin of the wireless device based at least in part on signals received by the transceiver, means for transmitting, via the transceiver, link margin information for reception by a second wireless device in response to a receipt of information transmitted by the second wireless device.

A further aspect of this invention is a wireless device including a transceiver, means for receiving an acknowledgment of a receipt of information from a second wireless device, the acknowledgement including link margin information of the second wireless device; and a transmit power adjustment module for adjusting a transmit power of the transceiver based at least in part on the link margin information.

Still further features and advantages of the present invention are identified in the ensuing description, with reference to the drawings identified below.

BRIEF DESCRIPTION OF THE DRAWINGS

The purpose and advantages of the present invention will be apparent to those of ordinary skill in the art from the following detailed description in conjunction with the appended drawings in which like reference characters are used to indicate like elements, and in which.

DETAILED DESCRIPTION OF THE INVENTION

The following description is intended to convey a thorough understanding of the present invention by providing a number of specific embodiments and details involving the minimization of the transmit power used by a wireless station. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

For ease of illustration, the various techniques of the present invention are discussed below in the context of IEEE 802.11-based wireless networking. However, those skilled in the art, using the teachings provided herein, may advantageously implement the disclosed techniques in other wireless networks. Accordingly, reference to techniques and components specific to IEEE 802.11, such as an 802.11-specific frame format, applies also to the equivalent technique or component in other wireless network standards unless otherwise noted.

Figure 1:
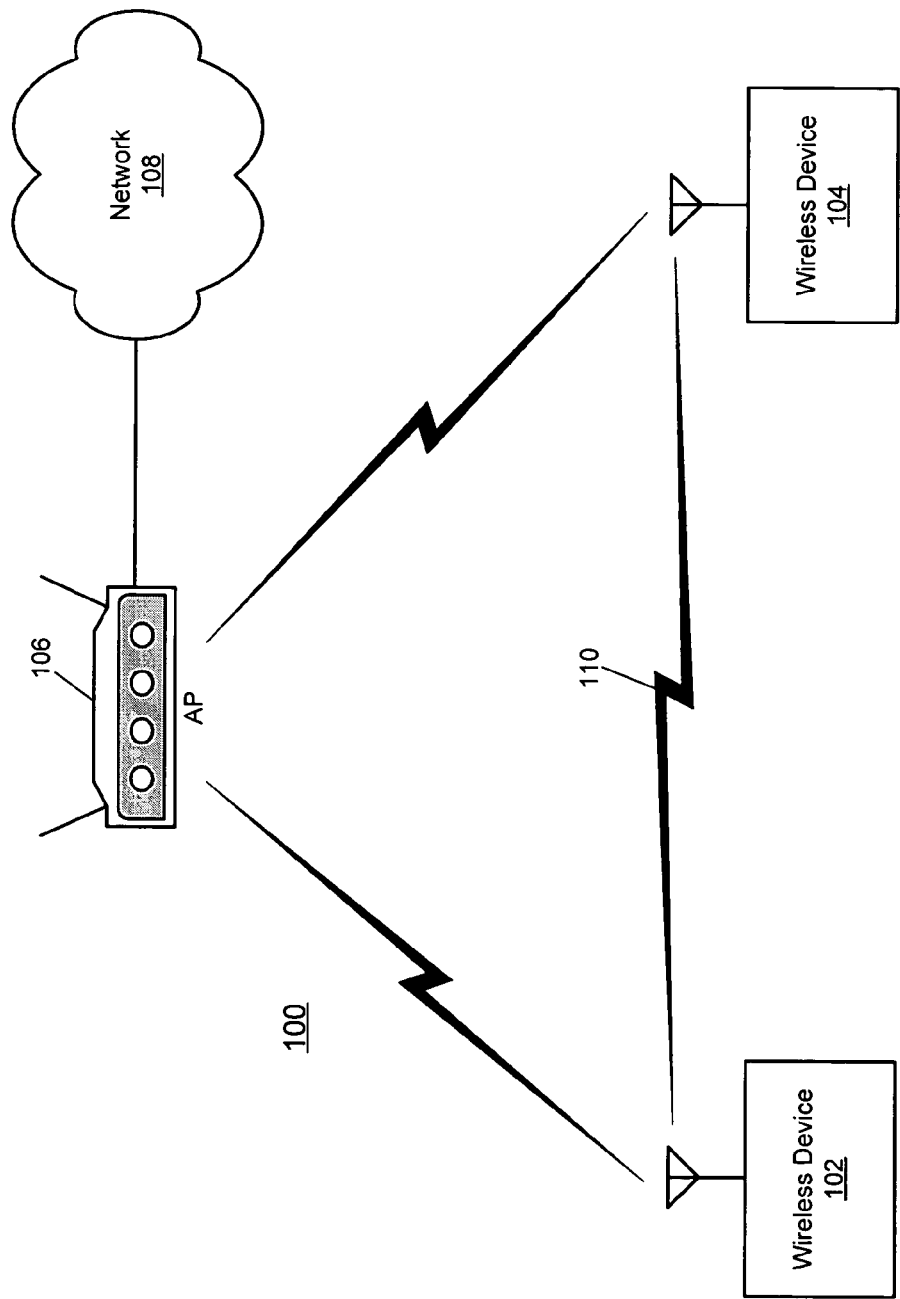
FIG. 1 is a schematic diagram illustrating an exemplary wireless system in which various power management techniques may be advantageously implemented in accordance with at least one embodiment of the present invention.

Referring now to FIG. 1, an exemplary system 100 employing one or more power saving techniques disclosed herein is illustrated in accordance with at least one embodiment of the present invention. System 100 incorporates a general wireless network topology wherein one or more wireless devices (e.g., wireless devices 102 and 104) are associated with at least one access point 106. The wireless devices 102 and 104 include devices enabled to communicate wirelessly using one or more protocols. Such protocols may include, for example, the IEEE 802.11 protocols (802.11a/b/e/g/i), HiperLAN, etc. Examples of wireless-enabled devices may include notebook (or "laptop") computers, handheld computers, desktop computers, workstations, servers, portable digital assistants (PDAs), cellular phones, etc.

The access point 106 may be connected to an infrastructure network 108 or other network, such as, for example, the Internet, a local area network (LAN), a wide area network (WAN), and the like. Thus, wireless devices 102 and 104 may communicate with one or more networked devices on an infrastructure network via the access point 106. Moreover, the wireless devices 102 and 104 may communicate with each other via the access point 106 or via a wireless direct link 110 between the devices 102 and 104. Exemplary techniques for establishing and maintaining the wireless direct link 110 are described, for example, in U.S. Pat. Application No. 60/515,701, the entirety of which is incorporated by reference herein.

In conventional systems, wireless devices typically are configured to transmit at the maximum permissible transmit power to help ensure that the receiving device (either an access point or another wireless device) accurately receives the transmitted signal. This frequently results in excessive power consumption by the transmitting wireless device because the maximum permissible transmit power often is substantially more than sufficient to ensure that the receiving device receives the transmitted signal intact. This excessive power consumption can lead to the premature draining of battery power supplies, the premature degradation of the transceiver due to excessive heat, and increased energy costs.

Accordingly, the present invention provides various techniques for reducing the transmit power of a transmitting wireless device without substantially impairing a receiving wireless device's ability to accurately receive the transmitted signal. In at least one embodiment, a receiving wireless device transmits an indication of its link margin to the transmitting wireless device. Based on the link margin of the receiving wireless device, the transmitting wireless device may reduce its transmit power, thereby reducing its power consumption without jeopardizing receiving wireless device's ability to accurately receive and process the transmitted signal. Exemplary techniques for transmitting an indication of a receiving wireless device's link margin to a transmitting wireless device are described in detail with reference to FIGS. 2-3.

In certain instances, a transmitting wireless device may be in communication with a number of receiving wireless devices. To illustrate, in the system 100, the wireless device 102, for example, may be in communication with the access point 106 and the wireless device 104 (via direct link 110). Communication between the wireless devices 102 and 104 and the access point 106 may be performed using, for example, a two-antenna transceiver at the wireless device 102, with one antenna transmitting and receiving with the access point 106 over one channel and another antenna transmitting and receiving with the wireless station 104 over a second channel. In this instance, the wireless station 102 may be adapted to receive a separate indication of a link margin from each of the access point 106 and the wireless device 104 and, in response, adjust the transmit power of the corresponding antenna accordingly.

In other instances, the access point 106 and wireless devices 102 and 104 may communicate over the same channel. The wireless device 102 therefore may adjust the transmit power of its transceiver in accordance with the smallest link margin of the receiving devices. For example, if the access point 106 has a link margin of 16 dB and the wireless station 104 has a link margin of 12 dB with respect to transmissions from the wireless device 102, the wireless device 102 may adjust its transmit power based on the 12 dB link margin regardless of whether the wireless device 102 is transmitting to the access point 106 or transmitting to the wireless device 104. Alternatively, the wireless device 102 may adjust its transmit power based on the link margin of the wireless device to which the wireless device 102 is preparing to transmit a signal. To illustrate using the above example, the wireless device 102 may use a first transmit power to transmit a signal to the access point 106, but use a second, lower transmit power to transmit a signal to the wireless device 104 due to its lower link margin. In addition to changing the transmit power, the transmit rate may be changed too. Selecting a higher rate implies that the coding gain will be lower, which has an effect similar to decreasing the transmit power. In the following, adjusting the transmit power will be used to indicate both mechanisms, i.e. adjusting the actual transmit power and adjusting the coding gain.

Figure 2:
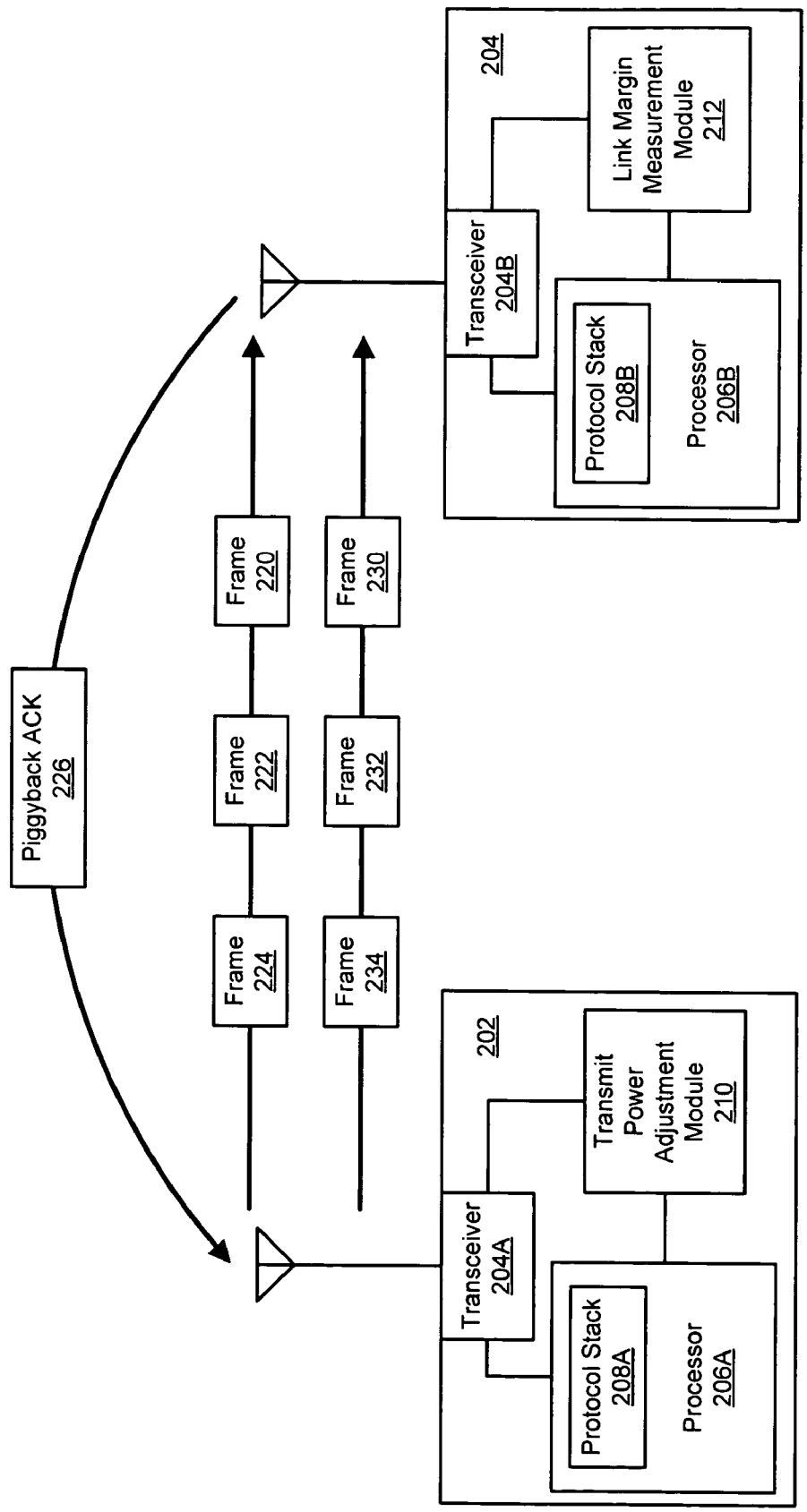
FIG. 2 is a schematic diagram illustrating an exemplary transmitting wireless device and an exemplary receiving wireless device in accordance with at least one embodiment of the present invention.
Figure 3:
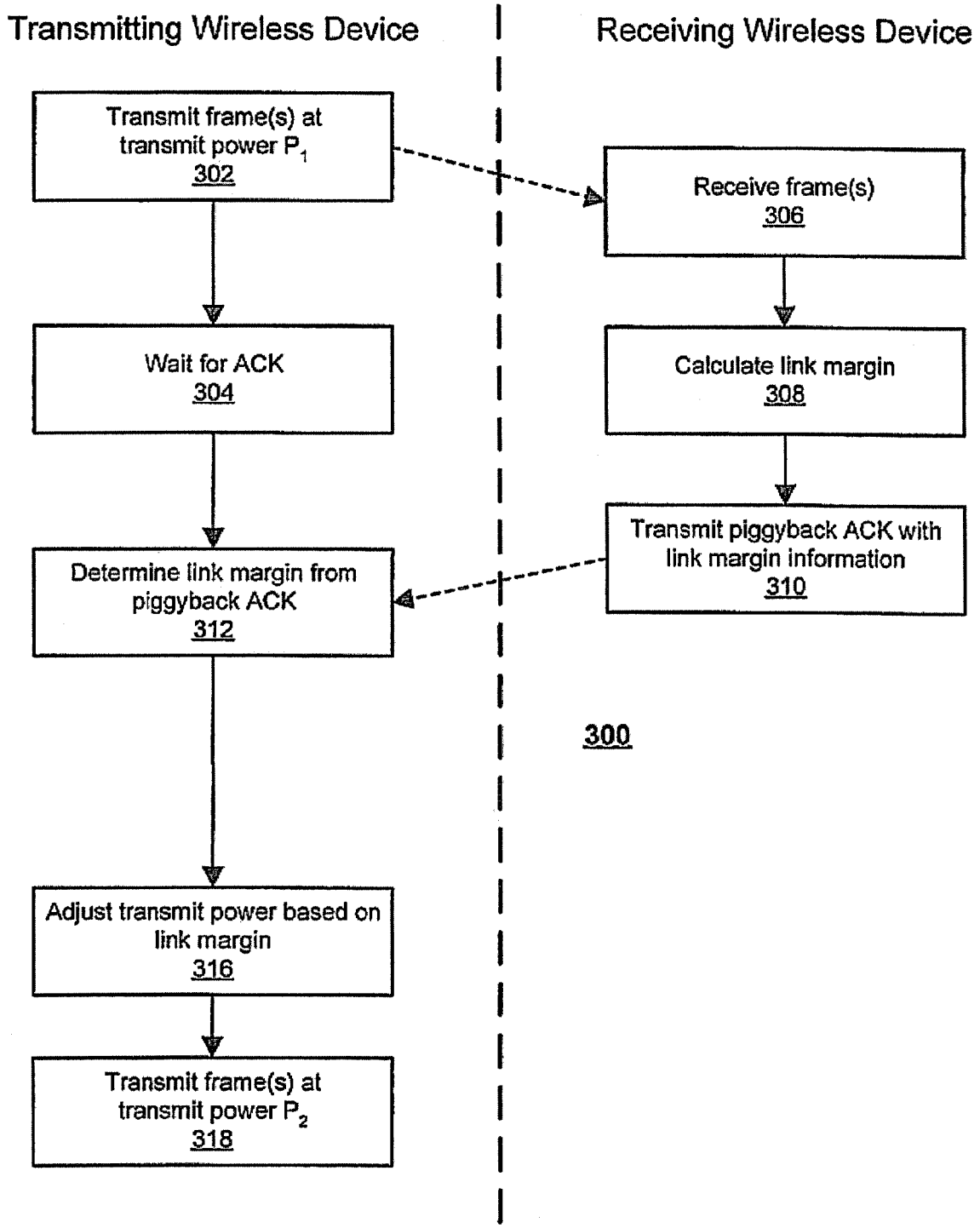
FIG. 3 is a flow diagram illustrating exemplary methods of operation of the exemplary wireless devices of FIG. 2 in accordance with at least one embodiment of the present invention.

Referring now to FIGS. 2 and 3, an exemplary transmitting wireless device 202 and an exemplary receiving wireless device 204, as well as an exemplary method 300 of their operation, are illustrated in accordance with at least one embodiment of the present invention. Although wireless device 202 is referred to herein as a transmitting wireless device and wireless device 204 is referred to as a receiving wireless device for ease of reference, wireless devices 202 and 204 may act as both transmitters and receivers of information depending on their use and implementation. Accordingly, those skilled in the art will appreciate that a wireless device may implement the features of both the transmitting wireless device 202 and receiving wireless device 204 such that the wireless device is enabled to both adjust its transmit power based at least in part on the link margin of another wireless device, as well as transmit an indication of its link margin to another wireless device.

In the illustrated example of FIG. 2, the transmitting wireless device 202 includes at least a transceiver 204A for transmitting and/or receiving signals, a processor 206A and a protocol stack 208A for processing and otherwise preparing information for transmission via the transceiver 204A, as well as for processing information received via the transceiver 204A. The transmitting wireless device 202 further includes a transmit power adjustment module 210 for adjusting the transmit power of the transceiver based at least in part on link margin information received from a receiving wireless device (e.g., wireless device 204). The transmit power adjustment module 210 may be implemented as software, hardware, firmware, or a combination thereof. To illustrate, the transmit power adjustment module 210 may be implemented as a software component of the protocol stack 208A, as a separate software program or module executed by the processor 206A, or as a software or hardware component implemented as part of the transceiver 204A.

As with the wireless device 202, the wireless device 204 includes a transceiver 204B for transmitting and/or receiving signals to and from other wireless devices and a processor 206B and protocol stack 208B for processing received information and information to be transmitted. The wireless device 204 further includes a link margin measurement module 212 for measuring the link margin of the transceiver 204B. The link margin measurement module 212 may be implemented as software, hardware, firmware, or a combination thereof, and may be implemented as a part of the transceiver 204B, the protocol stack 208B, a software program or module executed by the processor 206B, as a separate hardware or software component, and the like.

As noted above, a conventional wireless device typically transmits at the maximum permissible power because it is unaware or uncertain of the link margin of the receiving wireless device. To overcome this lack of information on the part of the transmitting wireless device, in at least one embodiment, the receiving wireless device 204 is adapted to measure its link margin relative to previous transmissions from the transmitting wireless device 202 and to send an indication of this link margin to the wireless device 202. In one embodiment, the wireless device 204 may be adapted to measure and transmit an indication of its link margin to the transmitting wireless device 202 without prompting from the wireless device 202. To illustrate, the wireless device 204 may be adapted to periodically transmit an indication of its link margin to the wireless device 202 as, for example, a data frame or to transmit an indication of its link margin when its link margin changes. In this case, the link margin information may be provided to the processor 206B and protocol stack 208B and be included as part of a data frame for transmission via the transceiver 204B.

This unprompted approach, while effective at informing the transmitting wireless device 202 of its link margin, is somewhat inefficient as bandwidth between the wireless devices 202 and 204 is consumed by the transmission of standard data packets having link margin information. Accordingly, in other embodiments, link margin information is provided to the transmitting wireless device 202 by including the link margin information with other information to be transmitted, thereby resulting in a reduction in the bandwidth consumed by the transmission of link margin information. In one embodiment, the link margin information may be concatenated with other data to be transmitted to the wireless device 202, where the link margin information and data are transmitted as a single frame to the wireless device 202. To this effect, an LLC encapsulation may be used to indicate to the receiver that the further portion of the payload contains a Link Margin information element with a well known length, followed by the regular data portion. A regular data frame would have contained only the data portion, but not the embedded Link margin information element. In another embodiment, the link margin is appended to the MAC header and the MAC header indicates that this a frame of a type which includes link margin information. In another embodiment, the link margin is encoded in MAC header fields that are currently unused, while through the association or link setup process, the receiver knows that the sender is capable of encoding the link margin in these information fields, and will interpret the information fields accordingly.

In another embodiment, the wireless device 204 may make use of acknowledgement (ACK) frames to transmit link margin information. Many wireless standards provide for the use of an ACK frame to acknowledge receipt of a data frame or other type of frame from a transmitting device. Typically, these wireless standards mandate that upon receipt of certain types of frames, the receiving device immediately acknowledge with an ACK frame. In certain instances, however, some wireless standards provide for the possibility to combine the ACK frame with data to be transmitted from the receiving device to the transmitting device into a single frame for transmission to the transmitting device. The resulting frame having both data and an ACK is commonly referred to as a piggyback ACK frame, indicating that the ACK is "piggybacked" onto the data frame. To illustrate, IEEE 802.11e provides for a combined quality-of-service (QoS)/data/ACK frame type (one example of a piggyback frame) that may be transmitted to acknowledge receipt of a data frame from a transmitting device, where the combined QoS/data/ACK frame includes both an ACK for a received data frame as well as data. As illustrated with reference to FIGS. 3 and 4, the receiving wireless device 204 may use a piggyback ACK frame to transmit to the transmitting wireless device 202 both an ACK to acknowledge receipt of a data frame from the wireless device 202 and link margin information to permit the wireless device 202 to adjust the transmit power of its transceiver 204A accordingly. As a result, link margin information may be transferred without significantly consuming additional bandwidth to do so.

In another embodiment, the response frame also includes the expected link margin for the next higher transmit rate, and/or a suggested optimal transmit rate to reach this receiver, and/or an indication of the signal strength with which the frame was received, and/or an indication of the overall quality with which the frame was received. In the remainder of this disclosure, the link margin will be assumed to refer to any of these possibilities.

Referring to FIG. 3, an exemplary method 300 for minimizing power consumption by providing the transmitting device 202 with link margin information is illustrated. In the illustrated example, steps 302, 304 and 312-318 are performed at the transmitting wireless device 202 and steps 306-310 are performed at the receiving wireless device 204.

The exemplary method 300 initiates at step 302 wherein the transmitting wireless device 202 transmits one or more frames 220-224 to the receiving wireless device 204 at a first transmit power (designated herein as $P_1$). The one or more frames 220-224 may include, for example, data frames, ACK frames, QoS frames, and the like. At step 304 the transmitting wireless device 202 waits for a response frame, which could be an ACK frame, from the receiving wireless device 204 acknowledging receipt of the one or more frames 220-224.

At step 306, the wireless device 204 receives the signals representative of one or more of the transmitted frames 220-224, converts the frames to an appropriate data form, and processes the data using the processor 206B or other component. At step 308, the link margin measurement module 212 measures the link margin of the receiving wireless device 204 with respect to signals transmitted by the transmitting wireless device 202. Any of a variety of techniques may be used to measure the link margin of the receiving wireless device. In one embodiment, the link margin may be measured from the signal representing the one or more frames 220-224 received at step 306. For example, the link margin measured for the last frame received from the wireless device 202 (e.g., frame 224) may be designated, at least temporarily, as the link margin of the wireless device 204 with respect to the wireless device 202. Alternatively, the wireless device 202 may measure the link margin as a moving average of link margin values measured on recently received frames. For example, the link margin could be designated as the average link margin for the last X frames received, where X represents the size, in terms of frames, of the window. In general, the link margin is the difference between the sensitivity of the receiver for a certain PHY rate and the received signal strength. The sensitivity will be different for different PHY rates, due to the differences in coding gain and other factors which are implementation dependent.

It may be advantageous to adjust the transmit power of the transmitting wireless device 202 even though no data has yet to be transmitted to the receiving device 204. Accordingly, to receive a frame from the wireless device 202 by which the link margin may be measured, the receiving wireless device 204 may be adapted to transmit a data frame to the wireless device 202. In response, the transmitting wireless device 202 typically sends an ACK frame to acknowledge receipt of the data frame. The signal representing the ACK frame (one embodiment of frames 220-224) then may be used by the link margin measurement module 212 to determine the link margin value (step 306).

Link Margin information may be added to any return frame, like an ACK, CTS, or Data frame. ACK and CTS are control response frames, which are transmitted after a SIFS period. The Data frame could be transmitted after SIFS period (i.e. after being polled) or after a backoff. Indicating that Link Margin information is appended to the return frame may be achieved in the following way:

An indicator bit inside the Frame Control or QoS Control Field indicates that additional information is present, like Link Margin information. This method works for all frame types.

An LLC encapsulation which indicates that additional information is appended, like Link Margin information. This mechanism works only for Data frames, because ACK and CTS have no data payload which could contain an LLC layer encapsulation.

A new frame type/subtype is used to indicate the presence of a MAC header which includes link margin information.

The Link Margin information may be added as a fixed field or in the form of a Link Margin Information Element. The generic format of Information Elements is defined in the IEEE 802.11 spec. It may be possible that any number of Information Elements can be appended, in which case an Information Element count may be included. A final possibility is that Data is also encapsulated as an Information Element and appended to the string of Information Element.

At step 310, an indication of the link margin measured at step 308 is incorporated into a return frame 226 in the ways described above and transmitted to the wireless device 202. The indication of the link margin may include, for example, a value corresponding to the measured link margin value, an index to one of a plurality of link margin ranges that includes the measured link margin value, and the like.

At step 312, the transmitting wireless device 202 receives the return frame 226 and processes the return frame 226 using, for example, the processor 206A and protocol stack 208A to determine the link margin of the wireless device 204. Determining the link margin from the return frame 226 may include, for example, extracting a link margin value from a corresponding field of the return frame 226, extracting an index value from a corresponding field, where the index value corresponds to a particular link margin value of a table of link margin values, and the like.

Based at least in part on the link margin information, the transmit power adjustment module 210 determines, at step 316, an adjusted second transmit power (designated herein as $P_2$) for the transceiver 204A when transmitting signals to the transceiver 204B of the wireless device 204. The degree to which the transmit power adjustment module 210 adjusts the transmit power of the transceiver 204A may be determined from the link margin in any of a variety of ways. For example, it may be appropriate to reduce the transmit power of the transceiver 204A by an amount substantially equal to the link margin (i.e., $P_2 \approx P_1 -$ link margin). Alternatively, it may be appropriate to reduce the transmit power by an amount commensurate with the link margin while leaving a small margin for error (i.e., $P_2 \approx P_1 -$ link margin+error margin). As yet another example, it may be appropriate to reduce the transmit power by an amount substantially proportionate to the magnitude of the link margin (i.e., $P_2 \approx P_1 - A*$link margin+error margin, $0 < A < 1$).

Moreover, the transmitting wireless device 202 may use other information in addition to the link margin to select an appropriate adjusted transmit power. To illustrate, the packet error rate (PER) is a common metric used to indicate the integrity of a transmitted signal. Thus, the transmit power adjustment module 210 may successively lower the transmit power of the transceiver 204A in view of the link margin until the PER becomes intolerable (e.g., a PER>10%). The transmit power where the PER becomes excessive therefore could represent the minimum allowable transmit power that may be selected for the current link margin. Although various techniques for determining an appropriate adjustment to the transmit power of the transceiver 204A based at least one part on the link margin of the wireless device 204 have been described, those skilled in the art may develop alternate techniques using the guidelines provided herein without departing from the spirit or the scope of the present invention.

After adjusting the transmit power of the transceiver 204A, subsequent frames (e.g., frame 230-234) may be transmitted to the receiving wireless device 204 at the reduced transmit power $P_2$ at step 318. It will be appreciated that the link margin of the wireless device 204 with respect to wireless device 202 may change due to a change in the distance between devices 202, 204, the introduction of noise or other interference, and the like. Accordingly, in at least one embodiment, the method 300 may be reiterated one or more times to readjust the transmit power of the transceiver 204A on a sporadic, periodic or continuous basis. For example, the wireless device 202 may initiate a readjustment of its transmit power every X frames transmitted or the wireless device 204 may monitor changes in the link margin and initiate a readjustment of the transmit power of the wireless device 202 whenever the link margin changes by a significant amount.

As noted above, increasing the transmit (or PHY) rate and reducing the transmit power are two effective techniques for minimizing power consumption. However, in certain situations, reducing the transmit power may only be effective in minimizing power consumption if the maximum supportable transmit rate is already in use between the wireless devices 202 and 204. Accordingly, in one embodiment, the adjustment of transmit power based at least in part on link margin is employed after establishing the maximum supportable transmit rate. To this end, the link margin also may be used as an indicator for establishing an appropriate transmit rate in addition to its use in adjusting the transmit power.

As a result of the application of exemplary method 300, the power consumed by the transceiver 204 in transmitting subsequent frames at an adjusted transmit power is less than had the transceiver 204 continued to transmit at the original transmit power. At the same time, because the transmitting wireless device 202 is provided with the link margin of the receiving wireless device 202, the transmitting wireless device 202 can select an appropriate degree of adjustment that is unlikely to result in reception problems by the receiving wireless device 204.

Other embodiments, uses, and advantages of the invention will be apparent to those skilled in the art from consideration of the specification and practice of the invention disclosed herein. The specification and drawings should be considered exemplary only, and the scope of the invention is accordingly intended to be limited only by the following claims and equivalents thereof.

The invention claimed is:

1. A method comprising:
   receiving, at a first wireless device, a plurality of first frames from a second wireless device;
   the first wireless device determining an overall link margin by calculating a moving average of individual link margins for each of the plurality of frames received from the second wireless device; and
   the first wireless device transmitting the overall link margin for reception by the second wireless device in a second frame.

2. The method as in claim 1, wherein the second frame is an acknowledgement (ACK) frame acknowledging receipt of one or more first frames.

3. The method as in claim 1, wherein the second frame is a clear to send (CTS) frame.

4. The method as in claim 1, further comprising:
   the first wireless device transmitting an estimate of a link margin at one or more other wireless transmission rates in the second frame response.

5. The method as in claim 1, further comprising:
   the first wireless device transmitting an estimate of an optimal transmission rate in the second frame response.

6. The method as in claim 1, wherein a presence of the link margin in the second frame response is indicated by a bit in a MAC header of the second frame.

7. The method as in claim 1, wherein a presence of the link margin in the second frame response is indicated by a specific type/subtype combination inside a MAC header of the second frame.

8. The method as in claim 2, wherein the link margin is included in a Frame Control field of the ACK frame.

9. The method as in claim 2, wherein the link margin is included in a Quality of Service (QoS) field of the ACK frame.

10. The method as in claim 1, further comprising the first wireless device determining the overall link margin and transmitting the overall link margin for reception by the second wireless device without being instructed to do so by the second wireless device.

11. The method as in claim 10, wherein the first wireless device determines the overall link margin and transmits the overall link margin for reception by the second wireless device at a regular periodic interval.

12. The method as in claim 10, wherein the first wireless device determines the overall link margin and transmits the overall link margin for reception by the second wireless device at a sporadic interval.

13. The method as in claim 10, wherein the first wireless device determines the overall link margin and transmits the overall link margin for reception by the second wireless device on a continuous basis, such that an updated overall link margin is attached to every frame transmitted to the second wireless device.

14. A method comprising:
   receiving, at a first wireless device, a frame from a second wireless device, the second frame including a link margin of the second wireless device; and
   successively lowering a transmit power of the first wireless device based at least in part on the link margin of the second wireless device until a packet error rate reaches a threshold at which the packet error rate becomes intolerable.

15. The method as in claim 14, wherein the second frame is an acknowledgement (ACK) frame acknowledging receipt of the one or more first frames.

16. The method as in claim 14, further comprising:
the first wireless device transmitting, at the successively lowered transmit power, additional one or more frames from the first wireless device for reception by the second wireless device.

17. The method of claim 14, wherein the first wireless device includes at least a first and second antenna, and wherein successively lowering the transmit power of the first wireless device comprises:
successively lowering the transmit power via the first antenna based at least in part on the link margin of the second wireless device until the packet error rate rises above 10%; and
separately adjusting a transmit power via the second antenna based at least in part on a link margin received from a third wireless device.

18. The method of claim 14, wherein the first wireless device is in communication with a third wireless device and receives an indication of a link margin of the third wireless device, and wherein successively lowering the transmit power of the first wireless device comprises:
successively lowering the transmit power of the first wireless device based on a smallest of the link margins received from the second and third wireless devices for communications with the second and third wireless devices until a packet error rate rises above 10%.

19. The method of claim 14, wherein the threshold at which the packet error rate becomes tolerable occurs when the packet error rate rises above 10%.

20. The method of claim 14, further comprising transmitting, from the first wireless device to the second wireless device, one or more frames; and wherein the receiving a frame from a second wireless device is responsive to the transmitting one or more frames.

21. A method comprising:
receiving, at a second wireless device, a plurality of frames transmitted by a first wireless device at a first transmit power;
the second wireless device determining an overall link margin by calculating a moving average of individual link margins for each of the plurality of frames received from the first wireless device;
transmitting an acknowledgement (ACK) frame from the second wireless device for reception by the first wireless device, the ACK frame acknowledging receipt of one or more frames at the second wireless device and including the link margin of the second wireless device determined relative to the one or more frames; and
receiving, at the second wireless device, one or more additional frames transmitted by the first wireless device at a second transmit power lower than the first transmit power.

22. The method as in claim 21, further comprising the second wireless device determining the overall link margin and transmitting the overall link margin for reception by the second wireless device without being instructed to do so by the first wireless device.

23. The method as in claim 22, wherein the second wireless device determines the overall link margin and transmits the overall link margin for reception by the first wireless device at a regular periodic interval.

24. The method as in claim 22, wherein the second wireless device determines the overall link margin and transmits the overall link margin for reception by the first wireless device at a sporadic interval.

25. The method as in claim 22, wherein the second wireless device determines the overall link margin and transmits the overall link margin for reception by the first wireless device on a continuous basis, such that an upload overall link margin is attached to every frame transmitted to the first wireless device.

26. A first wireless device comprising:
a transceiver configured to receive a plurality of first frames from a second wireless device;
a link margin measurement module configured to determine a link margin of the first wireless device based at least in part on a calculation of a moving average of individual link margins for each of the plurality of first frames received by the transceiver;
wherein the transceiver is further configured to transmit the determined link margin in a second frame for reception by the second wireless device.

27. The wireless device as in claim 26, wherein the second frame is an acknowledgement frame.

28. The wireless device as in claim 27, wherein the link margin is included in a Quality of Service (QoS) field of the acknowledgement frame.

29. The first wireless device as in claim 23, wherein the link margin measurement module is configured to determine the link margin and to cause the means for transmitting to transmit the determined link margin to the second wireless device without being instructed to do so by the second wireless device.

30. The first wireless device as in claim 29, wherein the link margin measurement module is configured to determine the link margin and to cause the means for transmitting to transmit the determined link margin to the second wireless device at a regular periodic interval.

31. The first wireless device as in claim 29, wherein the link margin measurement module is configured to determine the link margin and to cause the means for transmitting to transmit the determined link margin to the second wireless device at a sporadic interval.

32. The first wireless device as in claim 29, wherein the link margin measurement module is configured to determine the link margin and to cause the means for transmitting to transmit the determined link margin to the second wireless device on a continuous basis, such that an updated overall link margin is attached to every frame transmitted to the second wireless device.

33. A first wireless device comprising:
a transceiver configured to:
transmit one or more frames to a second wireless device; and
receive an acknowledgment of receipt of the one or more frames from the second wireless device, the acknowledgement including a link margin of the second wireless device based at least in part on the reception of the one or more frames; and
a transmit power adjustment module configured to successively lower a transmit power of the transceiver based at least in part on the link margin of the second wireless device until a packet error rate reaches a threshold at which the packet error rate becomes intolerable.

34. The wireless device as in claim 33, wherein the acknowledgement includes an ACK frame.

35. The wireless device as in claim 34, wherein the link margin information is included in a Quality of Service (QoS) field of the ACK frame.

36. The wireless device as in claim 33, wherein the transceiver includes a first and second antenna, the means for transmitting including means for transmitting one or more frames to the second wireless via the first antenna and means for transmitting one or more frames to a third wireless device via the second antenna, and wherein the transmit power adjustment module is further configured to:
  successively lower a transmit power via the first antenna based at least in part on the link margin of the second wireless device until a packet error rate rises above 10%; and
  separately adjust a transmit power via the second antenna based at least in part on a link margin received from the third wireless device.

37. The wireless device as in claim 33, wherein the means for transmitting including means for transmitting one or more frames to the second wireless and one or more frames to a third wireless device, wherein the means for receiving an acknowledgement of receipt includes means for receiving an acknowledgement of receipt of the one or more frames from the third wireless device and including a link margin of the third wireless device, and wherein the transmit power adjustment module is further configured to:
  successively lower the transmit power of the first wireless device based on a smallest of the link margins received from the second and third wireless devices for communications with the second and third wireless devices until a packet error rate rises above 10%.

38. An article of manufacture including a tangible computer-readable medium having instructions stored thereon that, if executed by a computing device, cause the computing device to perform operations comprising:
  receiving a plurality of first frames from a wireless device;
  determining an overall link margin by calculating a moving average of individual link margins for each of the plurality of frames received from the wireless device; and
  transmitting the overall link margin for reception by the wireless device in a second frame.

39. An article of manufacture including a tangible computer-readable medium having instructions stored thereon that, if executed by a computing device, cause the computing device to perform operations comprising:
  receiving, at a first wireless device, a frame from a second wireless device, the second frame including a link margin of the second wireless device; and
  successively lowering a transmit power of the first wireless device based at least in part on the link margin of the second wireless device until a packet error rate reaches a threshold at which the packet error rate becomes intolerable.

40. The article of manufacture of claim 39, wherein the successively lowering the transmit power of the first wireless device comprises successively lowering the transmit power via a first antenna based at least in part on the link margin of the second wireless device until the packet error rate rises above the threshold, and separately adjusting a transmit power via a second antenna based at least in part on a link margin received from a third wireless device.

41. The article of manufacture of claim 39, wherein the first wireless device is in communication with a third wireless device and receives an indication of a link margin of the third wireless device, and wherein successively lowering the transmit power of the first wireless device comprises successively lowering the transmit power of the first wireless device based on a smallest of the link margins received from the second and third wireless devices for communications with the second and third wireless devices until a packet error rate rises above the threshold.

* * * * *

UNITED STATES PATENT AND TRADEMARK OFFICE
CERTIFICATE OF CORRECTION

| | | |
|---|---|---|
| PATENT NO. | : 7,933,293 B2 | Page 1 of 1 |
| APPLICATION NO. | : 10/880366 | |
| DATED | : April 26, 2011 | |
| INVENTOR(S) | : Menzo Mentink | |

It is certified that error appears in the above-identified patent and that said Letters Patent is hereby corrected as shown below:

IN THE CLAIMS

In Claim 1, column 10, line 14, please delete "the plurality of frames" and insert --the plurality of first frames--.

In Claim 14, column 10, line 64, please delete "the second frame" and insert --the frame--.

In Claim 15, column 11, line 4, please delete "the second frame" and insert --the frame--.

In Claim 15, column 11, line 6, please delete "the one or more first frames" and insert --one or more first frames--.

In Claim 38, column 14, lines 2-3, please delete "the plurality of frames" and insert --the plurality of first frames--.

In Claim 39, column 14, line 11, please delete "the second frame" and insert --the frame--.

Signed and Sealed this
Third Day of January, 2012

David J. Kappos
*Director of the United States Patent and Trademark Office*